June 4, 1940.  W. W. CUSHMAN  2,203,047
ROTARY ENGINE
Filed Jan. 6, 1939  3 Sheets-Sheet 3
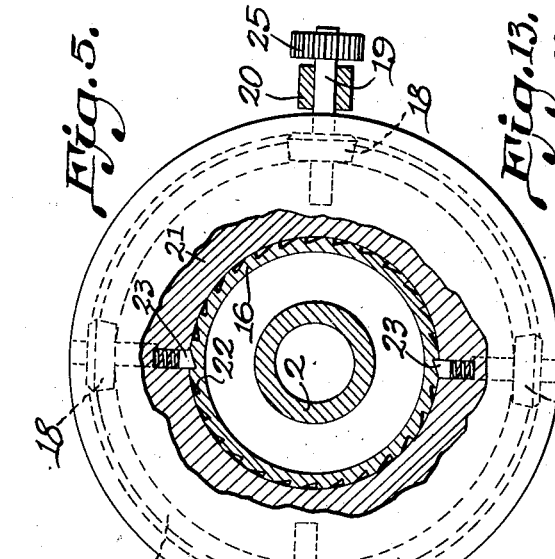
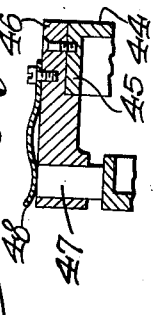
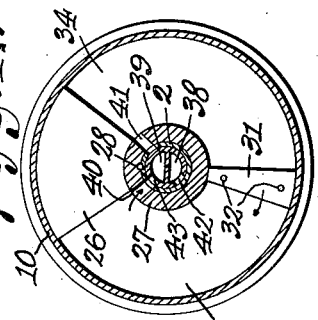
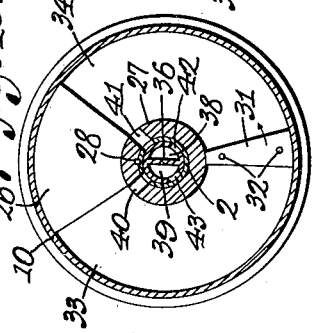
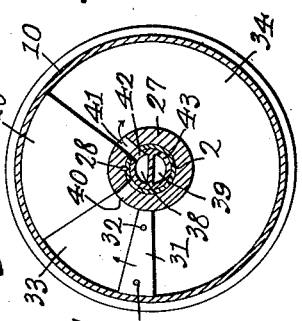
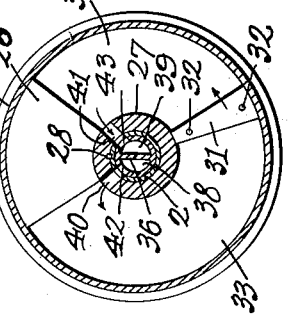
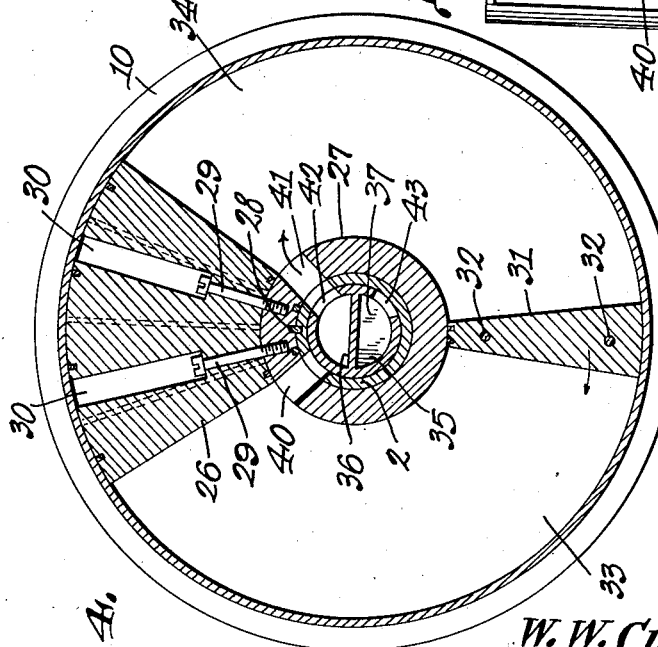
W. W. Cushman INVENTOR.
BY C. A. Snow & Co.
ATTORNEYS.

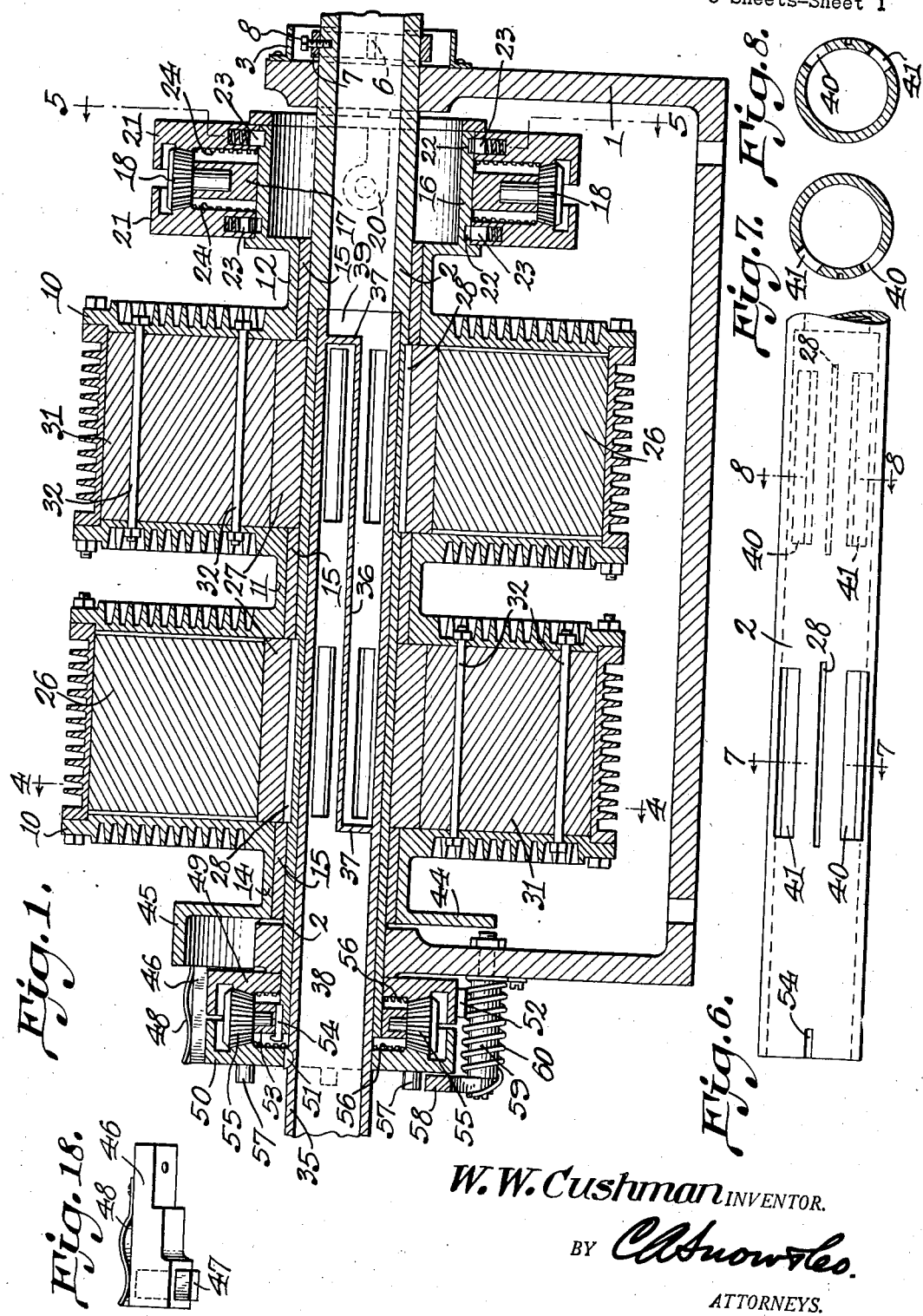

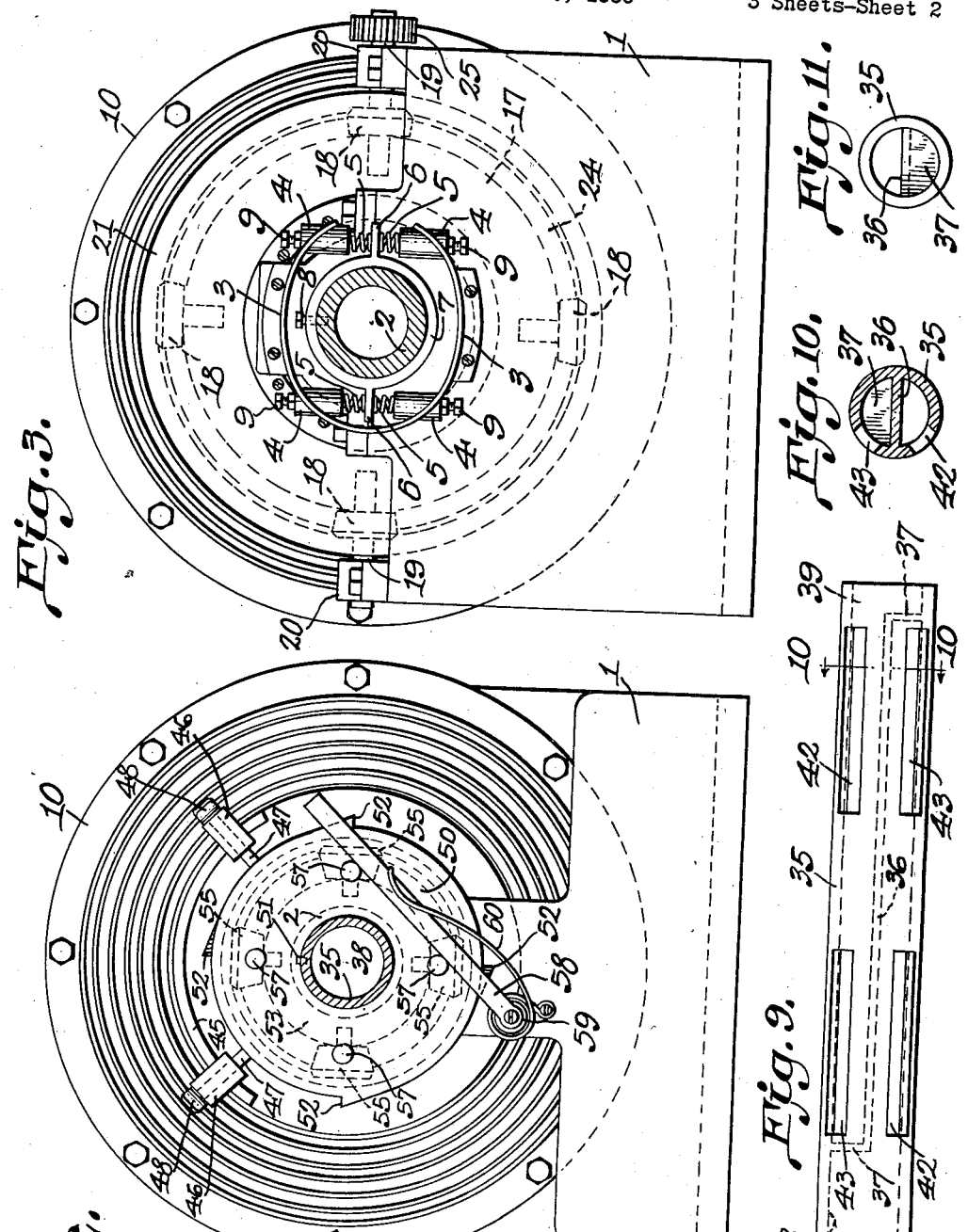

Patented June 4, 1940

2,203,047

UNITED STATES PATENT OFFICE 2,203,047

ROTARY ENGINE

Walton W. Cushman, Webb City, Mo.

Application January 6, 1939, Serial No. 249,646

7 Claims. (Cl. 123—42)

This invention aims to provide a novel internal combustion engine structure, including one or more drums, mounted for rocking movement, novel means being provided for controlling the inlet of fuel and the exit of exhaust from the drums, and novel means being provided for taking off power from the drums.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in longitudinal section, a device constructed in accordance with the invention;

Fig. 2 is an end elevation;

Fig. 3 is an elevation showing the opposite end of the structure from that depicted in Fig. 2;

Fig. 4 is a transverse section on the line 4—4 of Fig. 1;

Fig. 5 is a transverse section on the line 5—5 of Fig. 1;

Fig. 6 is an elevation of the fixed support;

Fig. 7 is a cross section on the line 7—7 of Fig. 6;

Fig. 8 is a cross section on the line 8—8 of Fig. 6;

Fig. 9 is an elevation of the rotary valve;

Fig. 10 is a cross section on the line 10—10 of Fig. 9;

Fig. 11 is an end elevation of the rotary valve;

Fig. 12 is an elevation showing one of the anchorage rings;

Fig. 13 is a sectional view disclosing a portion of one of the pawl and ratchet mechanisms;

Figs. 14 to 17 are diagrams employed in explaining the operation of the engine;

Fig. 18 is a perspective view of the pawl-carrying bracket, in the position which it occupies in Fig. 1.

In the following description, no heed has been given to packings, cooling instrumentalities, firing means, securing elements and other common parts forming no portion of the present application, and capable of being supplied by a mechanic.

In carrying out the invention, there is provided a supporting frame 1 which, preferably, but not necessarily, is of the U-shape shown in Fig. 1. Tubular support 2 is mounted in a substantially fixed position in the upstanding ends of the frame 1. Any suitable means may be supplied, however, for securing the benefits of a floating power, so far as the shaft 2 is concerned. If desired, recourse may be had to the simple structure next to be described.

To one upstanding end of the frame 1 is secured a substantially elliptical, open sided bracket 3, which appears in Figs. 1 and 3. The bracket 3 carries sockets 4, receiving the outer ends of compression springs 5, the inner ends of the springs bearing upon the oppositely disposed fins 6 of a ring 7, secured at 8 to the shaft 2. Adjusting devices 9 in the sockets 4 afford a means whereby the compressive effort of the springs 5 may be varied. The construction is such that a satisfactory but not mandatory floating power structure is supplied.

Drums 10 are mounted for oscillatory swinging movement with respect to the axis of the support 2. The drums 10 are connected by an intermediate hub 11, one drum having an end hub 12, and the other drum having an end hub 14. Between the hubs 14, 11 and 12, on the one hand, and the fixed support or shaft 2 on the other hand, are located bearings 15, which may be of any preferred construction.

The hub 12 carries a hollow cylindrical head 16, and about the head is disposed a fixed annular pinion support 17, whereon beveled pinions 18 are mounted to turn, about axes at right angles to the axis of the support 2. Figure 3 shows that the shafts 19 of oppositely disposed pinions 18 are mounted to turn in bearings 20, projecting inwardly from one end member of the frame 1. The construction is such that although the pinions 18 can rotate, the pinion support 17 is fixed against rotation.

Gear members 21 are mounted for rotary movement in opposite directions on the head 16, the members 21 being supplied on their inner surfaces with gears 24, cooperating with the beveled pinions 18. The head 16 is equipped with oppositely facing peripheral ratchets 22, adapted to coact with oppositely disposed, spring pressed pawls 23, slidable in the gear members 21, there being a pair of pawls for each of the gear members.

When, by an internal combustion structure to be described hereinafter, the oscillatory drums 10 and the head 16 turn in one direction, the pawls 23 of one of the gear members 21 are driving pawls for that gear member, the said gear member rotating the pinions 18, the pinions 18 imparting reverse rotation to the other gear member 21, the pawls of said other gear member becoming clicking pawls. When the oscillatory drums 10 and the head 16 turn in an opposite direction, the pawls 23 that formerly were clicking pawls become driving pawls for the gear member 21 which carries them, and the pawls that formerly were driving pawls becoming clicking pawls. Thus, although the gear members 21 have step by step rotation in opposite directions, the pinions 18 receive continuous rotation in one direction. Figure 3 shows that the shaft 19 of one of the pinions 18 is provided with any suitable means 25, by which power can be taken off.

Passing to the internal combustion engine structure whereby oscillatory movement is imparted to the drums 10 and associated parts, for instance the head 16 and its ratchets 23, Fig. 4 shows that in each drum 10 there is disposed a fixed sectorial abutment 26 secured mediately to the fixed tubular support 2. The abutments 26 in the drums 10 are arranged opposite to each other, as Fig. 1 will make manifest.

Substantial anchorage rings 27 are located in the drums 10, and are keyed at 28 to the fixed support or shaft 2. The abutments 26 are secured to the rings 27 by attaching elements 29, such as machine screws, having their heads located in recesses 30 in the abutments. Sectorial pistons 31 are disposed within the drums 10 and are connected to the drums in any suitable way, for example by securing devices or bolts 32, depicted in Fig. 1.

Noting Figs. 14 to 17, it will be obvious that if, through the intake, compression, explosion and exhaust of a fuel mixture, the pistons 31 of the drums 10 can be made to swing toward and from opposite sides of the fixed abutments 26, an oscillatory movement will be imparted to the drums 10, that movement being converted into a continuous rotation in one direction, at the power take-off means 25 of Fig. 3, through the instrumentality of the mechanism including the gear members 21 of Fig. 1, and associated parts, hereinbefore described, both as to structure and as to operation.

Referring to Figs. 4, 14, 15, 16 and 17, it appears that, considering the piston 31 relatively to the abutment 26, there is on one side of the piston a chamber 33, and upon the other side of the piston there is a chamber 34.

An elongated sleeve valve 35 is mounted for rotation in one direction in the tubular support 2. There is a longitudinal partition 36 in the sleeve valve 35, the ends of the partition being connected to opposed portions of the sleeve valve by end walls 37. The partition 36—37 forms a fuel inlet conduit 38 in one end of the sleeve valve 35, and an exhaust outlet conduit 39 in the opposite end thereof.

On one side of the abutment 26, the fixed ring 27 and the fixed support 2 have a port 40: and on the opposite side of the abutment 26, the ring and the support have a port 41. The sleeve valve 35 has ports 42 and 43, so placed that at times they may register, respectively, with the ports 40 and 41, as shown in Fig. 14. The ports individual to one drum 10 are opposite to the corresponding ports for the other drum, and since the abutments 26 in the two drums, and the pistons 31 in the drums, are correspondingly located, and the drums receive impulse alternately, and each drum receives alternate impulses in opposite directions. With that observation, the operation will be confined to one of the drums 10.

In Fig. 14, the following conditions exist. Ports 40 and 42 in register. Ports 41 and 43 in register. Intake to chamber 33 by way of conduit 38 and ports 42 and 40. Exhaust from chamber 34 by way of ports 43 and 41 and conduit 39.

In Fig. 15, the following conditions exist. Port 40 closed. Port 42 in register with port 41. Port 43 closed. Compression in chamber 33. Intake to chamber 34 by way of conduit 38 and ports 42 and 41.

In Fig. 16, the following conditions exist. Ports 40 and 41 closed. Ports 42 and 43 closed. Combustion in chamber 33. Compression in chamber 34.

In Fig. 17, the following conditions exist. Port 43 in register with port 40. Port 41 closed. Port 42 closed. Exhaust from chamber 33 by way of ports 40 and 43, and exhaust conduit 39. Combustion in chamber 34.

The means for firing the compressed charge forms no part of the present invention.

It will be observed that the rotation of the sleeve valve 35 takes place in four steps of ninety degrees each, and means for securing a step by step rotation of the sleeve valve will next be set forth.

A disk 44 is secured to the hub 14 which oscillates with the drums 10, the disk having a projecting rim 45. Brackets 46 are secured to the rim 45 (Fig. 13) and extend parallel to the axis of the sleeve valve 35. The brackets 46 are ninety degrees apart, as Fig. 2 will show. In the brackets 46, oppositely-operating pawls 47 are slidably mounted, the pawls being advanced by springs 48 secured to the brackets.

A first or inner gear member 49 is mounted to rotate on the support 2, and a second or outer gear member 50 is keyed at 51 to the rotary valve 35. The gear members 49 and 50 have oppositely facing ratchets 52, shown in Fig. 2, each ratchet being composed of two teeth and opposite to each other, each tooth on one ratchet being ninety degrees remote from a tooth on the other ratchet, to give the valve 35 the step by step rotation called for by Figs. 14 to 17, the ratchets cooperating with the pawls 47.

A pinion carrier 53 is keyed at 54 to the support 2, and, therefore, is fixed. Beveled pinions 55 are journaled on the pinion support 53 and mesh with gears 56 on the inner surfaces of the gear members 49 and 50.

It will be obvious from what has been said hereinbefore in connection with the mechanism on the head 16 that, when oscillatory rocking movement is imparted to the drums and associated parts, step by step, ninety-degree rotation will be given to the valve 35, to effect the port cooperation forming the subject matter of illustration in Figs. 14 to 17.

In order to obtain a continuing proper relation between the ratchets 52 on the gear members 49 and 50, a means is supplied whereby the second or outer gear member 50 may be held releasably, at each ninety degree step of its rotation. With that end in view, the outer gear member 50 is supplied with lateral projections 57, and the projections 57 are adapted to be engaged, two at a time, by a radius arm 58, pivoted to an outstanding bracket 59, carried by one end member of the frame 1. A spring 60 is anchored to the frame 1, engaged loosely about the bracket 59, and has a bearing on the radius arm 58, to swing the radius arm inwardly, as will be seen when Fig. 2 of the drawings is noted.

The operation of the device has been set forth hereinbefore, step by step, but, briefly considered, is as follows:

The oscillating drums 10 rotate the power take off 25 continuously in one direction, and ninety degree, step by step rotation in one direction is imparted to the rotary valve 35, by means of the gear members 49 and 50, and associated parts.

The head 16 and the disk 44 may be referred to properly and conveniently as parts of the drums 10.

Having thus described the invention, what is claimed is:

1. In an internal combustion engine, a fixed support, a drum mounted for rocking oscillation on the support and having an internal piston wing, an abutment carried by the support and extended into the drum, the piston wing cooperating with the abutment to form chambers in the drum, on opposite sides of the abutments, valve means controlling the admission of fuel to each chamber, and controlling the exit of exhaust from each chamber, mechanism for operating the valve means from the drum, and means for taking power from the drum.

2. In an internal combustion engine, a fixed tubular support, a drum mounted for rocking oscillation on the support and having an internal piston wing, an abutment carried by the support and extended into the drum, the piston wing cooperating with the abutment to form chambers in the drum, on opposite sides of the abutment, a rotary valve journaled in the support and having a fuel inlet and an exhaust outlet, the valve controlling the admission of fuel to each chamber from the inlet, and controlling the exit of exhaust from each chamber to the outlet, mechanism for operating the valve from the drum, and means for taking power from the drum.

3. In an internal combustion engine, a fixed tubular support, a drum mounted for rocking oscillation on the support and having an internal piston wing, an abutment carried by the support and extended into the drum, the piston wing cooperating with the abutment to form chambers in the drum, on opposite sides of the abutment, a rotary valve journaled in the support and having a fuel inlet and an exhaust outlet, the valve controlling the admission of fuel to each chamber from the inlet, and controlling the exit of exhaust from each chamber to the outlet, mechanism for imparting rotary movement to the valve in one direction, from the drum, and means for taking power from the drum.

4. In an internal combustion engine, a fixed tubular support, a drum mounted for rocking oscillation on the support and having an internal piston wing, an abutment carried by the support and extended into the drum, the piston wing cooperating with the abutment to form chambers in the drum, on opposite sides of the abutment, a valve controlling the admission of fuel to each chamber and the exit of exhaust from each chamber, the valve being mounted to rotate in the support, mechanism for rotating the valve from the drum, a head connected to the drum, gear members mounted to rotate on the head, oppositely operating pawl and ratchet mechanisms connecting the gear members with the head, a fixed pinion support, and a pinion mounted to rotate on the pinion support, the pinion meshing with the gear members.

5. In an internal combustion engine, a fixed support, a drum mounted for rocking oscillation on the support and having an internal piston wing, an abutment carried by the support and extended into the drum, the piston wing cooperating with the abutment to form chambers in the drum, on each side of the abutment, valve means controlling the admission of fuel to each chamber, and the exit of exhaust from each chamber, mechanism for operating the valve means from the drum, a head connected to the drum, gear members mounted to rotate on the head, oppositely operating pawl and ratchet mechanisms connecting the gear members with the head, a fixed pinion support, a pinion mounted to rotate on the pinion support, the pinion meshing with the gear members, and means for taking power from the pinion.

6. In an internal combustion engine, a fixed tubular support, a drum mounted for rocking oscillation on the support and having an internal piston wing, an abutment carried by the support and extended into the drum, the piston wing cooperating with the abutment to form chambers in the drum, on each side of the abutment, a rotary valve journaled in the support and controlling the admission of fuel to each chamber and the exit of exhaust from each chamber, means for taking power from the drum, and mechanism for imparting rotary movement in one direction to the valve, said mechanism embodying gear members, one of which is fixed to the valve, the other of which is rotatable with respect to the support, a fixed pinion carrier between the gear members, and a pinion meshing with the gear members, the pinion being journaled on the pinion carrier for rotation about an axis substantially at right angles to the axis of rotation of the valve, and oppositely-operating pawl and ratchet mechanisms forming working connections between a part of the drum and the gear members.

7. In an internal combustion engine, a fixed tubular support, a drum mounted for rocking oscillation on the support and having an internal piston wing, an abutment carried by the support and extended into the drum, the piston wing cooperating with the abutment to form chambers in the drum, on opposite sides of the abutment, the support having ports each communicating with one chamber, a rotary tubular valve journaled in the support, one end of the valve forming a fuel inlet and the other end of the valve forming an exhaust outlet, the valve having ports cooperating with the ports of the support to afford intake of fuel to the chambers, alternately, by way of the inlet, compression in the chambers, alternately, expansion in the chambers, alternately, and exhaust from the chambers alternately by way of the outlet, and mechanism for imparting step by step rotary movement in one direction to the valve, to secure cooperation between the ports of the valve and the ports of the support, said mechanism embodying gear members, one of which is fixed to the valve, the other of which is rotatable with respect to the support, a fixed pinion carrier between the gear members, a pinion meshing with the gear members, the pinion being journaled on the pinion carrier for rotation about an axis substantially at right angles to the axis of the valve, means for holding the valve releasably at each step in its rotation, and oppositely-operating pawl and ratchet mechanisms forming working connections between a part of the drum and the gear members.

WALTON W. CUSHMAN.